US010936786B2

(12) United States Patent
Qu et al.

(10) Patent No.: US 10,936,786 B2
(45) Date of Patent: Mar. 2, 2021

(54) METHOD AND SYSTEM FOR PROMPT MESSAGE DISPLAY

(71) Applicant: BEIJING DIDI INFINITY TECHNOLOGY AND DEVELOPMENT CO., LTD., Beijing (CN)

(72) Inventors: Baoming Qu, Beijing (CN); Jing Ou, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/875,504

(22) Filed: Jan. 19, 2018

(65) Prior Publication Data

US 2018/0181545 A1    Jun. 28, 2018

Related U.S. Application Data

(63) Continuation of application No. PCT/CN2016/111377, filed on Dec. 21, 2016.

(30) Foreign Application Priority Data

Jan. 25, 2016  (CN) .......................... 201610049092.1
Apr. 19, 2016  (CN) .......................... 201610246207.6
Sep. 7, 2016   (CN) .......................... 201610808068.1

(51) Int. Cl.
*G06F 3/0481*       (2013.01)
*G06F 40/103*       (2020.01)
(Continued)

(52) U.S. Cl.
CPC ........ *G06F 40/103* (2020.01); *G06F 3/04842* (2013.01); *G06F 3/04895* (2013.01); *G06F 9/453* (2018.02); *G06F 40/174* (2020.01)

(58) Field of Classification Search
CPC .. G06F 40/174; G06F 3/04895; G06F 3/0481; G06F 40/103; G06F 9/453
See application file for complete search history.

(56) References Cited

U.S. PATENT DOCUMENTS 6,483,526 B1    11/2002  Merrick
2004/0036722 A1*  2/2004  Warren ................ G06F 17/212
                                                                715/866
(Continued)

FOREIGN PATENT DOCUMENTS

CN    101963844 A    2/2011
CN    102436454 A    5/2012
(Continued)

OTHER PUBLICATIONS

"The anatomy of a text input field", Morten Hjerde, Jun. 24, 2008.*
(Continued)

*Primary Examiner* — Namitha Pillai
(74) *Attorney, Agent, or Firm* — Metis IP LLC

(57) ABSTRACT

The present disclosure relates to a system and a method for displaying a prompt message. The method includes displaying a first prompt message in an entry box on a user interface of an electronic terminal; determining there is an input instruction in the entry box; replacing the first prompt message with a second prompt message; and changing display status of the first prompt message.

20 Claims, 12 Drawing Sheets

(51) Int. Cl.
    *G06F 3/0489* (2013.01)
    *G06F 40/174* (2020.01)
    *G06F 9/451* (2018.01)
    *G06F 3/0484* (2013.01)

(56) References Cited

U.S. PATENT DOCUMENTS

| | | | | |
|---|---|---|---|---|
| 2006/0085761 | A1* | 4/2006 | Allen | G06F 40/174 715/780 |
| 2009/0144607 | A1 | 6/2009 | Chen | |
| 2013/0326392 | A1 | 12/2013 | Maltesson | |
| 2014/0207479 | A1 | 7/2014 | Noland et al. | |
| 2014/0298186 | A1* | 10/2014 | Bao | G06F 3/0482 715/738 |
| 2015/0370478 | A1 | 12/2015 | Okajima et al. | |
| 2018/0046606 | A1 | 2/2018 | Zhao et al. | |

FOREIGN PATENT DOCUMENTS

| | | | | |
|---|---|---|---|---|
| CN | 102722315 | A | | 10/2012 |
| CN | 103197893 | A | | 7/2013 |
| CN | 103605454 | A | | 2/2014 |
| CN | 103838475 | A | | 6/2014 |
| CN | 104049956 | A | | 9/2014 |
| CN | 105824487 | B * | 1/2015 | ........... G06F 3/0481 |
| CN | 303198279 | S | | 5/2015 |
| CN | 105426033 | A | | 3/2016 |
| CN | 105824487 | A | | 8/2016 |
| EP | 2669780 | A1 | | 12/2013 |

OTHER PUBLICATIONS

"CSS max-width Property", Sep. 25, 2016.*
International Search Report in PCT/CN2016/111377 dated Mar. 17, 2017, 4 pages.
Written Opinion in PCT/CN2016/111377 dated Mar. 20, 2017, 4 pages.
Extended Search Report in European Application No. 16887762.9 dated Jul. 23, 2018, 9 pages.
Written Opinion and Search Report in Singaporean Application No. 11201801296Q dated Nov. 7, 2019, 8 pages.
First Office Action in Chinese Application No. 201610049092.1 dated Sep. 27, 2019, 17 pages.
First Office Action in Chinese Application No. 201680079813.1 dated Oct. 29, 2020, 15 pages.

* cited by examiner

METHOD AND SYSTEM FOR PROMPT MESSAGE DISPLAY

CROSS-REFERENCE TO RELATED APPLICATIONS

This application is a continuation of International Application No. PCT/CN2016/111377, filed on Dec. 21, 2016, which claims priority of Chinese Patent Application No. 201610049092.1 filed on Jan. 25, 2016, Chinese Patent Application No. 201610246207.6 filed on Apr. 19, 2016, and Chinese Patent Application No. 201610808068.1 filed on Sep. 7, 2016, the entire contents of each of which are hereby incorporated by reference.

TECHNICAL FIELD

This application relates generally to a system and method for displaying a prompt message on a user interface of an electronic terminal.

BACKGROUND

When a user inputs information in an entry box of an electronic form, a prompt message may facilitate the user to input information. In some cases, the prompt message disappears when the user is inputting information, while the user may forget what needs to be input. In some cases, the user needs to delete inputted contents when the user wants to review the prompt message. In some cases, the prompt message is permanently displayed outside of the entry box, which may cause reduced space for the display of the information in the form. In some other cases, the prompt message includes too many words, and the prompt message can't be integrally displayed in the entry box. Such deficiencies described above may affect the visual quality of an electronic form and user experience.

SUMMARY

According to exemplary embodiments of the present disclosure, a system is provided. The system includes a computer-readable storage medium configured to store data and instructions; and a processor in communication with the computer-readable storage medium. When executing the instructions, the processor is directed to: display a first prompt message in an entry box of an electronic terminal; determine there is an input instruction in the entry box; replace the first prompt message with a second prompt message; and change display status of the first prompt message.

According to exemplary embodiments of the present disclosure, a method is provided. The method includes displaying a first prompt message in an entry box; determining there is an input instruction in the entry box; replacing the first prompt message with a second prompt message; and changing display status of the first prompt message.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
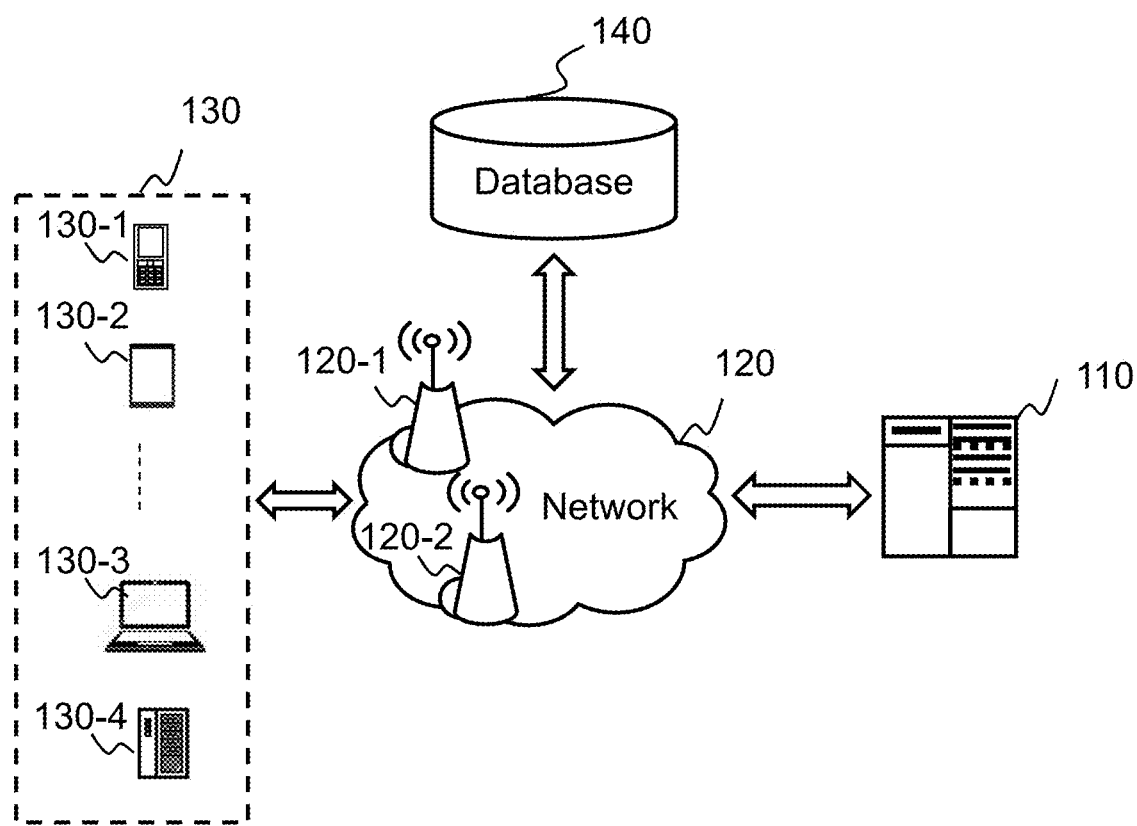
FIG. 1 is a block diagram of an information processing system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

It will be understood that the term "system," "device," "unit," "block," and/or "module" used herein are one method to distinguish different components, elements, parts, section, or assembly of different level in ascending order. However, the terms may be displaced by other expression if they may achieve the same purpose.

It will be understood that when a device, apparatus, unit, module, component, or block is referred to as being "on," "connected to," or "coupled to" another device, unit, module, or block, it may be directly on, connected or coupled to, or communicate with the other device, unit, module, block, or an intervening device, unit, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof. It will be further understood that the terms "entry box" and "inputting box," "input instruction" and "input focus," "prompt message" and "prompting message," "input information" and "input message," when used in this disclosure, may represent a similar meaning.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

FIG. 1 a block diagram of an information processing system 100 according to some embodiments of the present disclosure. Information used herein may be any data including, for example, a number, a text, a message, a voice, an image, a video, a parameter, a code, an instruction, a formula, a file, an algorithm, a program, or the like, or any combination thereof. Merely by way of example, the message may be a prompt message that provides a reminder according to some embodiments of the present disclosure. Information processing system 100 may include a server 110, a network 120, an electronic terminal 130, and a database 140.

Server 110 may run an online platform by processing information relating to a service request. For example, server 110 may determine feedback data based on the service request from electronic terminal 130 and one or more conditions. In some embodiments, server 110 may be a single server, or a server group. The server group may be centralized, or distributed (e.g., server 110 may be a distributed system). In some embodiments, server 110 may be local or remote. For example, server 110 may access information stored in electronic terminals 130, and/or database 140 via network 120. As another example, server 110 may be directly connected to electronic terminal 130, and/or database 140 to access stored information. In some embodiments, server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, server 110 may be implemented on an electronic terminal 130 having one or more components illustrated in FIG. 2A, or FIG. 2B, or both in the present disclosure.

Network 120 may facilitate exchange of information. In some embodiments, one or more components in information processing system 100 (e.g., server 110, electronic terminal 130, and database 140) may send information to other component(s) in information processing system 100 via network 120. For example, server 110 may obtain/acquire service request from electronic terminal 130 via network 120. In some embodiments, network 120 may be any type of a wired or wireless network, or any combination thereof. Merely by way of example, network 120 may include a cable network, a wire line network, an optical fiber network, a telecommunication network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, server 110 and/or electronic terminal 130 may include one or more network access points. For example, the network 120 may include wired or wireless network access points such as base stations and/or internet exchange points 120-1, 120-2, . . . , through which one or more components of the information processing system 100 may be connected to the network 120 to exchange data and/or information.

Electronic terminal 130 may be a terminal configured to receive, output, display, and/or process information. For example, electronic terminal 130 may receive information from server 110, network 120, database 140, or a user, etc. As another example, electronic terminal 130 may output or display information (e.g., a prompt message) to a user. As still another example, electronic terminal 130 may process information received from server 110, network 120, database 140, or a user, etc.

In some embodiments, the electronic terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a smart television, a smart video camera, an interphone, or the like, or any combination thereof. In some embodiments, the wearable device may include a smart bracelet, a smart footgear, a smart glass, a smart watch, a smart helmet, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the built-in device in the motor vehicle may include an onboard computer, an onboard television, etc.

Figure 3:
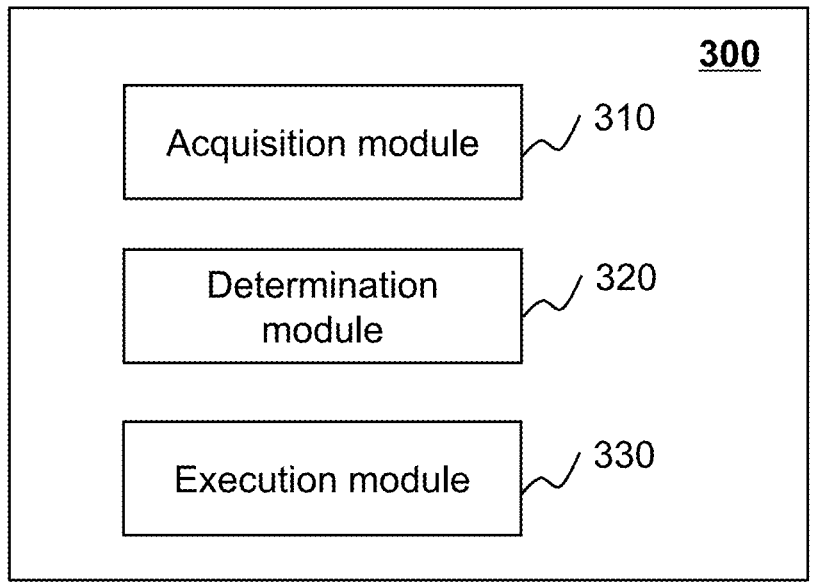
FIG. 3 is a block diagram of an exemplary processing engine according to some embodiments of the present disclosure.

In some embodiments, electronic terminal 130 may include a processing engine 300 (as illustrated in FIG. 3). The processing engine may process information and/or data relating to the service request to perform one or more functions described in the present disclosure. For example, the processing engine may determine whether an input message in electronic terminal 130 is appropriate. The processing engine may include one or more processing engines (e.g., single-core processing engine(s) or multi-core processor(s)). Merely by way of example, the processing engine may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing engine may be integrated in the server 110.

Database 140 may store data and/or information. In some embodiments, database 140 may store information obtained/acquired from electronic terminal 130. In some embodiments, database 140 may store instructions that server 110 may execute or use to perform exemplary methods described in the present disclosure. In some embodiments, database 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary mass storage may include a magnetic disk, an optical disk, a solid-state drive, etc.

In some embodiments, one or more components in information processing system 100 (e.g., server 110, electronic terminal 130, etc.) may provide a controlled access to database 140. In some embodiments, one or more components in information processing system 100 may read and/or modify information relating to a user, and/or the public when one or more conditions are met. For example, server 110 may read and/or modify one or more users' information after arranging service for the one or more users.

Figure 2A:
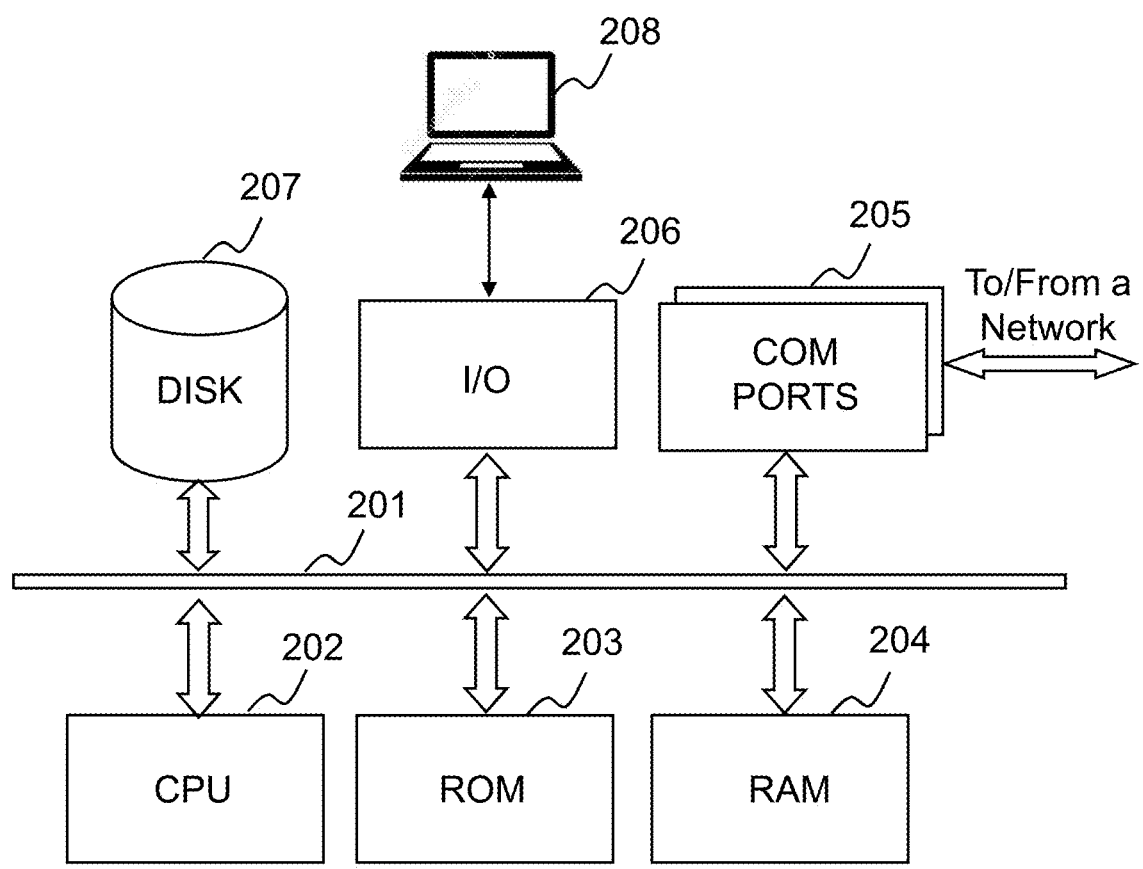
FIG. 2A and FIG. 2B illustrate exemplary computing device according to some embodiments of the present disclosure.

FIG. 2A is a block diagram of an exemplary hardware and software components of a computing device 200A on which the server 110 and/or electronic terminal 130 may be implemented according to some embodiments of the present disclosure. For example, electronic terminal 130 may be implemented on the computing device 200A and configured to perform functions of electronic terminal 130.

Computing device 200A may be a general purpose computer or a special purpose computer, both may be used to implement an information processing system for the present disclosure. Computing device 200A may be used to implement any component of the information processing serve as described herein. For example, electronic terminal 130 may work be implemented on computing device 200A, via its hardware, software program, firmware, or any combination thereof.

Computing device 200A, for example, may include COM ports 205 connected to and from a network connected thereto to facilitate data communications. Computing device 200A may also include a central processing unit (CPU) 202, in the form of one or more processors, for executing program instructions. The exemplary computer platform may include an internal communication bus 201, program storage and data storage of different forms, for example, a disk 207, and a read only memory (ROM) 203, or a random access memory (RAM) 204, for various data files to be processed and/or transmitted by the computer. The exemplary computer platform may also include program instructions stored in the ROM 203, RAM 204, and/or other type of non-transitory storage medium to be executed by the CPU 202. The methods and/or processes of the present disclosure may be implemented as the program instructions. In some embodiments, CPU 202 may be a main controller of the computing device 200A. CPU 202 may control every component in the computing device 200A, and connect them with each other to allow coordination with each other. In some embodiments, CPU 202 may control I/O component 206 to input or output message, wherein the control may include power control, transmitting rate control, inputting/outputting message size control, etc. In some embodiments, CPU 202 may control display component 208 to work in determined modes. And the control of display component 208 may include display quality control, display time control, display rate control, display switchover control, etc. In some embodiments, CPU 202 may control RAM 204 and/or ROM 203 to storage determined data. The control of RAM 204 and/or ROM 203 may include storing mode control, storing rate control, storage format control, storage life control. In some embodiments, CPU 202 may control other internal components in server 110 (or electronic terminal 130), and it may process the data and/or instructions transmitting between different components.

Display component 208 may provide an interactive interface for displaying information to a user. Information shown in display component 208 may be arranged inside and/or outside of a form, an entry box, a search box, or the like, or any combination thereof. In some embodiments, display component 208 may include a display screen or a touch screen. Display component 208 may display information from internal components of server 110 (or electronic terminal 130) (e.g., I/O component 206). In some embodiments, display component 208 may display information on an external screen that is in another server (or electronic terminal) connecting to server 110 (or electronic terminal 130).

I/O component 206 may support input/output between the computer and other components therein such as display component 208. Computing device 200A may also receive programming and data via network communications. I/O component 206 may control the input and output of information transmission. In some embodiments, the information input may include a user operation of entering message, or acquiring information from external environment (e.g., a user). The information output may giving out information to a user. The way of transmitting information may be wired or wireless. In some embodiments, I/O component 206 may be implemented by a user. In some embodiments, I/O component 206 may be performed by a transmitter, a receiver, a transceiver, a keyboard, a mouse, a microphone, a camera, a light pen, a pad, a display, a touch screen, or the like, or any combination thereof. In some embodiments, there may be a control unit (e.g., a switch) in the server 110 (or electronic terminal 130) to control the I/O module.

Merely for illustration, only one CPU and/or processor is described in computing device 200A. However, it should be note that computing device 200A in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200A executes both step A and step B, it should be understood that step A and step B may also be performed by two different CPUs and/or processors jointly or separately in computing device 200A (e.g., the first processor executes step A and the second processor executes step B, or the first and second processors jointly execute steps A and B).

Figure 2B:
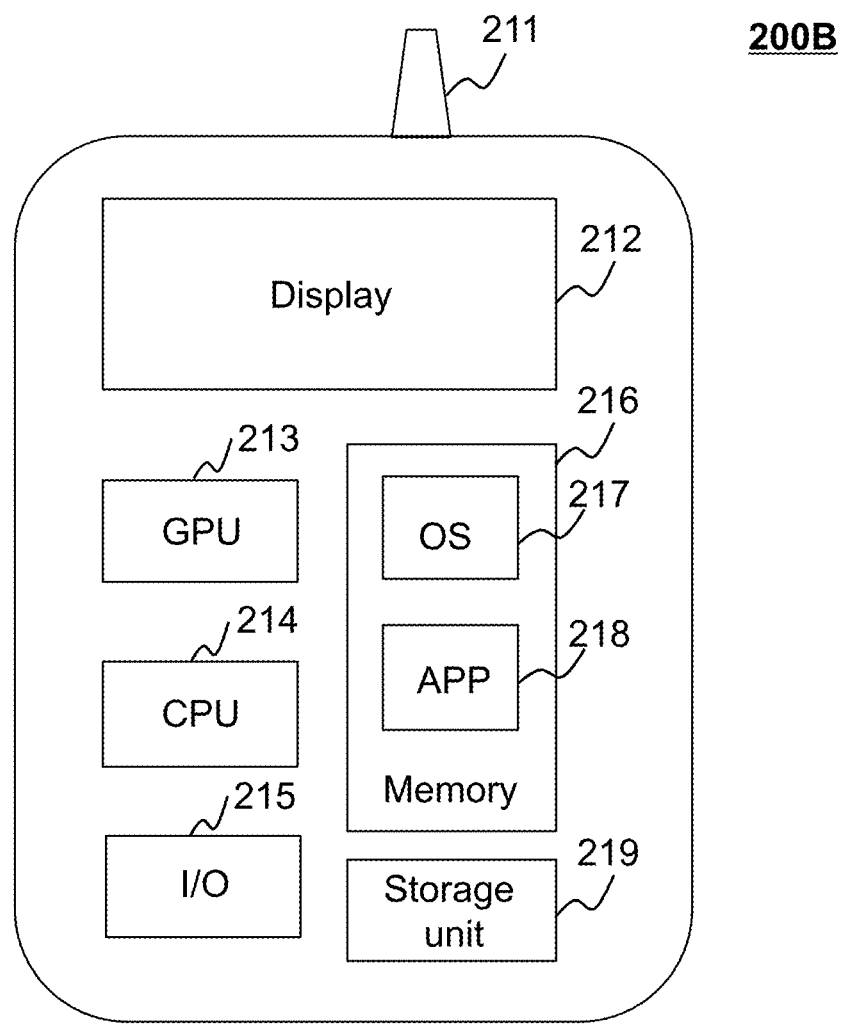

FIG. 2B is a block diagram of another exemplary hardware and software components of a computing device 200B on which the server 110 and/or electronic terminal 130 may be implemented according to some embodiments of the present disclosure. For example, electronic terminal 130 may be implemented on the computing device 200B and configured to perform functions of electronic terminal 130.

Computing device 200B in FIG. 2B may be a mobile device which may be used to implement an information processing system in the present disclosure. Computing device 200B may be used to implement any component of the information processing serve as described herein. For example, electronic terminal 130 may be implemented on computing device 200B, via its hardware, software program, firmware, or any combination thereof. Computing device 200B may be a smart phone, a laptop computer, a music player, a gaming device, a global positioning system (GPS) device, a wearable device (e.g., a smart glass or a smart glass), or other electronic terminal as described elsewhere in the present disclosure.

Computing device 200B, for example, may include a central processing unit (CPU) 214, a graphics processing unit (GPU) 213, a display component 212, a memory 216, an antenna 211, a storage unit 219, and an I/O component 215. Any suitable component, for example, a bus or a controller, may also be incorporated into computing device 200B. As illustrated in FIG. 2B, an operating system (OS) 217 and/or an application (App) may be loaded in memory 216 and executed by CPU 214. OS 217 may include an iOS system, Android system, Windows Phone system, or the like, or any combination thereof. App 208 may include a browser or an application implemented in computing device 200B for information processing.

In some embodiments, display component 212 and/or I/O component 215 of computing device 200B in FIG. 2B may have the same structures, functions, and/or types as the description of display component 208 and/or I/O component 206 of computing device 200A in FIG. 2A.

The methods and/or processes of the present disclosure may be implemented as the program instructions. In some embodiments, CPU 214 may be a main controller of the computing device 200B. CPU 214 may control every component in the computing device 200B, and connect them with each other to allow coordination with each other. In some embodiments, CPU 214 may control I/O component 215 to input or output message (e.g., a prompt message), wherein the control may include power control, transmitting rate control, inputting/outputting message size control, etc. In some embodiments, CPU 214 may control display 212 to work in determined modes. And the control of display 212 may include display quality control, display time control, display rate control, display switchover control, etc. In some embodiments, CPU 214 may control memory 218 or storage unit 219 to storage determined data. The control of memory 219 or storage unit 219 may include storing mode control, storing rate control, storage format control, storage life control. In some embodiments, CPU 214 may control other internal components in computing device 200B, and it may process the data and/or instructions transmitting between different components.

FIG. 3 is a block diagram of an exemplary processing engine 300 according to some embodiments of the present disclosure. Processing engine 300 (or briefly referred to as processor 300 elsewhere in the present disclosure) may be implemented on computing device 200A and/or computing device 200B. Processing engine 300 may include an acquisition module 310, a determination module 320, and an execution module 330. They may be interconnected and information may be transmitted between these modules. In some embodiments, there may be a cycle between these modules. For example, when the determination module 320 determines that information already acquired is incomplete, then an instruction may be sent to acquisition module 310 to cause it acquire more information, so that complete information may be acquired.

Acquisition module 310 may acquire information used for determination module 320. In some embodiments, acquisition module 310 may acquire information from I/O component 206 or 215, display component 208 or 212, DISK 207, ROM 203, RAM 204, memory 216, and/or storage unit 219. For example, acquisition module 310 may detect a form, an entry box, and/or a search box in display component 208 or 212 to acquire relevant information therein. In some embodiments, information acquired may include a prompt message, a pixel length of prompt message, a user operation, an input instruction, an input information, or the like, or any combination thereof. Merely by way of example, input instruction may be a mouse pointer clicking, a mouse pointer touching, or a finger touching from a user. In some embodiments, acquisition module 310 may send the acquired information to determination module 320 for further implementing.

Determination module 320 may generate a determination according to information received from acquisition module 310. For example, determination module 320 may compare pixel length values of prompt messages, and send out an instruction to execution module 330 for further process or execution. See, for example, FIG. 6 and the description thereof. As another example, determination module 320 may determine whether there is an input instruction in a form or in an entry box, and send out an instruction to execution module 330 for further process or execution. See, for example, FIG. 10 and the description thereof. As still another example, determination module 320 may assess input information and determine whether input information conflicts with a rule, and send out an instruction to execution module 330 for further process or execution. See, for example, FIG. 13A, or FIG. 13B, or both, and the description thereof. In some embodiments, determination module 320 may send out feedback data to acquisition module 310 according to the result. Acquisition module 310 may repeat its procedure according the feedback data. In some embodiments, the determination made by determination module 320 may also be based on information received from an external source. The external source may supply information for determination module 320. In some embodiments, the external source may be a user, a server, or another device. Merely by way of example, an email server may supply a rule (or a certificate) for determine module 320 to determine the correctness of information input by a user (e.g., an account name, a telephone number, a password, etc.).

Execution module 330 may execute an operation according to data or instructions received from determination module 320. In some embodiments, the executed operation may include moving a prompt message, changing color of a prompt message, adjusting font size of a prompt message, making a prompt message disappear, deleting an input information, playing an audio clip, displaying a new message, or turning on/off another electronic terminal, etc. For example, execution module 330 may move a prompt message or display a prompt message statically according to the instruction given out by determination module 320. See, for example, FIG. 6 and the description thereof. As another example, execution module 330 may replace a first prompt message with a second prompt message and change the display status of the first prompt message, according to the instruction given out by determination module 320. See, for example, FIG. 10 and the description thereof. In some embodiments, execution module 330 may display a third prompt message or replace the second prompt message with the first prompt message, according to the determination result given out by determination module 320. See, for example, FIG. 13A, or FIG. 13B, or both, and the description thereof. In some embodiments, after the execution, execution module 330 may send out feedback data to acquisition module 310 for repeating one or more times to optimize a final result.

Figure 4:
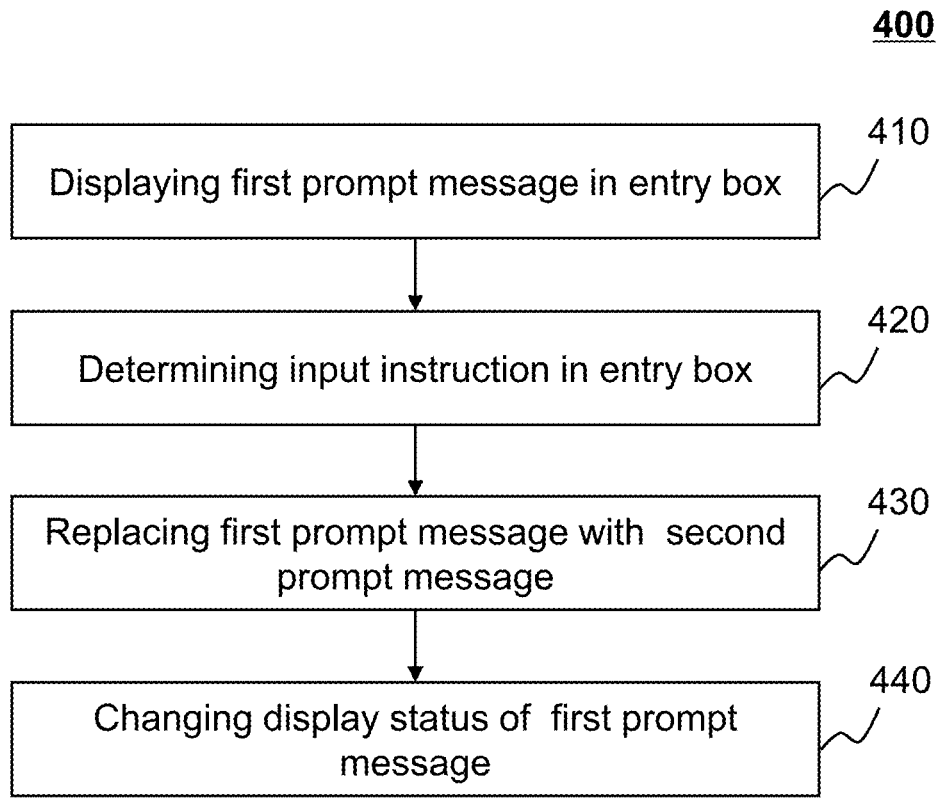
FIG. 4 is a flowchart of an exemplary process for displaying a prompt message according to some embodiments of the present disclosure.

FIG. 4 is a flowchart of an exemplary process 400 for displaying prompt message according to some embodiments of the present disclosure. In some embodiments, process 400 for displaying message may be implemented in computing device 200A and/or computing device 200B illustrated in FIG. 2A, or FIG. 2B, or both. For example, process 400 may be stored in DISK 207, ROM 203, RAM 204, memory 216, and/or storage unit 219 in the form of instructions, and invoked and/or implemented by processing engine 300. In some embodiments, process 400 may be implemented in a form illustrated in FIG. 5.

Figure 5:
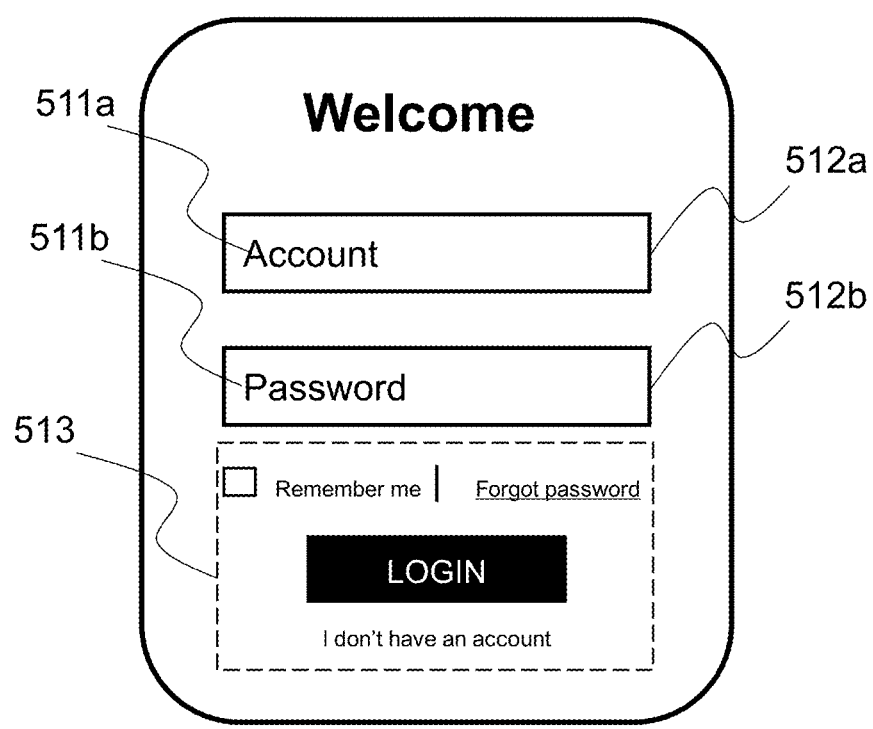
FIG. 5 is a graph of an exemplary interface of an electronic terminal according to some embodiments of the present disclosure.

At 410, processing engine 300 may display a first prompt message in an entry box of a form. In some embodiments, as illustrated in FIG. 5, a form 500 may be on an interface of electronic terminal 130. Entry box 512a, entry box 512b and some other contents 513 may be distributed in form 500. A first prompt message 511a may be displayed in entry box 512a. A first prompt message 511b may be displayed in entry box 512b. In some embodiments, the methods of displaying the first prompt message may be variable, according to different statuses. See examples illustrated in FIGS. 6-9. In some embodiments, the display of the first prompt message may be static or dynamic. In some embodiments, the first prompt message may be moved back and forth in the entry box to allow a user to view the entire first prompt message.

At 420, processing engine 300 may determine an input instruction in the entry box. In some embodiments, the input instruction may include a mouse pointer clicking, a mouse pointer touching, or a finger touching on the entry box. See, for example, FIG. 11A, or FIG. 11B, or both, and the description thereof. When an input instruction is detected, the entry box may display a symbol of input instruction. When the input instruction is triggered, processing engine 300 may execute 430.

In some embodiments, when at least part of the input instruction is detected or remains present, there may be one or more candidate entries displayed, e.g., in the drop-down box. The candidate entry or entries may be generated based on history input information of, for example, the user, a group the user belonging to, etc. The history information may be stored in DISK 207, ROM 203, RAM 204, memory 216, storage unit 219, or the like, or any combination thereof. A group the user belonging to may be determined based on, for example, the identification the user specifies, or at least a common character the user shares with other users (e.g., occupation, address, gender, age or age range, or the like, or any combination thereof). For example, when the user inputs the account information (e.g., an e-mail address, a phone number, etc.) for the first time, and selects "Remember me" as illustrated in 513 of FIG. 5, then the account information may be stored. The next time when the user wishes to enter the account, the stored account information may be displayed in the drop-down box available for selection. In some embodiments, the history of a user's input information may be tracked and stored, and the stored information may be processed to predict a probable input by the user subsequently. The tracked and stored information may include the content of user have input, the frequencies of different input information by the user, the time interval of user inputting specific information, the candidate information chosen recently or the total number of times within a period of time, the geographic position of the user when inputting information, or the like, or any combination thereof. Merely by way of example, between 18:00 to 19:00, a user inputs home address as the destination a high frequency, then these information may be tracked and stored. A next time when the user opens the form for choosing a destination between 18:00-19:00, the tracked and stored information may be predicted to the user, suggested to the user, and/or filled in the input box automatically.

At 430, processing engine 300 may replace the first prompt message with a second prompt message. The second prompt message may be different from the first prompt message. In some embodiments, the font size or position of the second prompt message may be adapted according to different scenarios. For example, when the pixel length of the second prompt message is larger than the pixel length of the entry box, processing engine 300 may decrease the font size of the second prompt message, or display the second prompt message in two or more rows, so as to fit the second prompt message into the entry box. As another example, when the pixel length of the second prompt message is larger than the pixel length of the entry box, processing engine 300 may move the second prompt message and display it dynamically. For example, the second prompt message may move back and forth in the entry box to allow a user to view the entire second prompt message. When the first prompt message is replaced by the second prompt message, processing engine 300 may execute 440.

At 440, processing engine 300 may change the display status of the first prompt message. In some embodiments, processing engine 300 may make the first prompt message disappear, change the position of the first prompt message, change a font size of the first prompt message, change the color of the first prompt message, or play an audio clip associated with the first prompt message, or the like, or any combination thereof. In some embodiments, processing engine 300 may move the first prompt message to a place in the entry box, to a place on the border of the entry box, or to a place outside the entry box. See, for example, FIG. 12A, or FIG. 12B, or both, and the description thereof. In some embodiments, the place in the entry box may be the left of the entry box, the right of the entry box, the top of the entry box, the bottom of the entry box, the center of the entry box, etc. The place in the entry box may be a position, for example, not overlapping with the second prompt message. The place on the border of the entry box may be the left border of the entry box, the right border of the entry box, the top border of the entry box, the bottom border of the entry box, a corner of the entry box, etc. The place outside the entry box may be a position outside the entry box, for example, near the entry box.

In some embodiments, when the input instruction is detected and a user is typing in a message in the entry box, there may be a suspension box for displaying the first prompt information and the second prompt message. The suspension box may move along with the input instruction, so as to allow the user to view the prompt message all the time during the process of inputting information.

Figure 6:
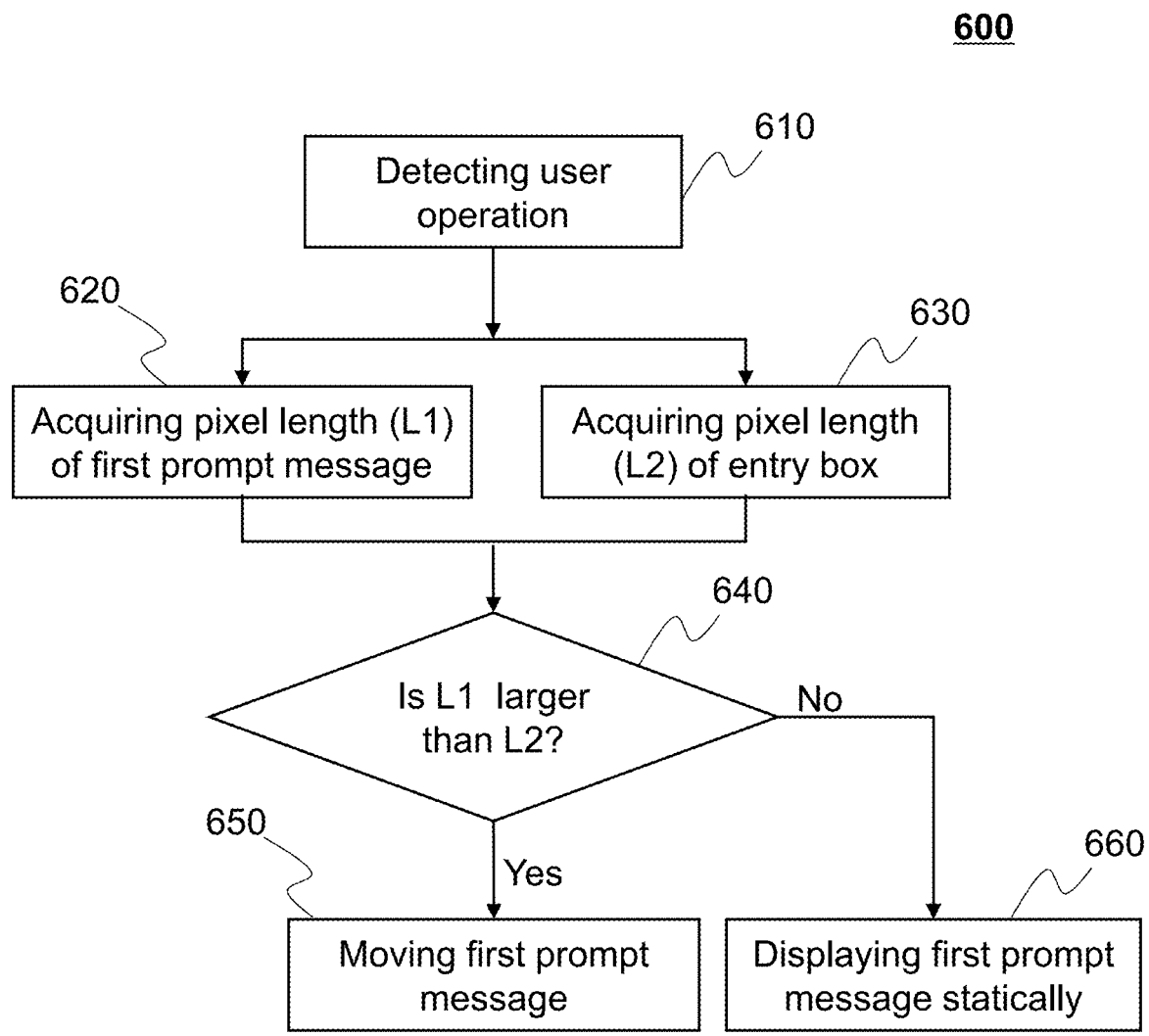
FIG. 6 is a flowchart of an exemplary process for displaying a first prompt message according to some embodiments of the present disclosure.

FIG. 6 is a flowchart of an exemplary process 600 for displaying a first prompt message according to some embodiments of the present disclosure. In some embodiments, process 600 may be implemented in computing device 200A and/or computing device 200B as illustrated in FIG. 2A, or FIG. 2B, or both. For example, process 600 may be stored in ROM 203, RAM 204, memory 216, and/or storage unit 219 in the form of instructions, and invoked and/or implemented by processing engine 300. In some embodiments, process 600 may be used in step 410 of process 400 illustrated in FIG. 4.

Figure 7A:
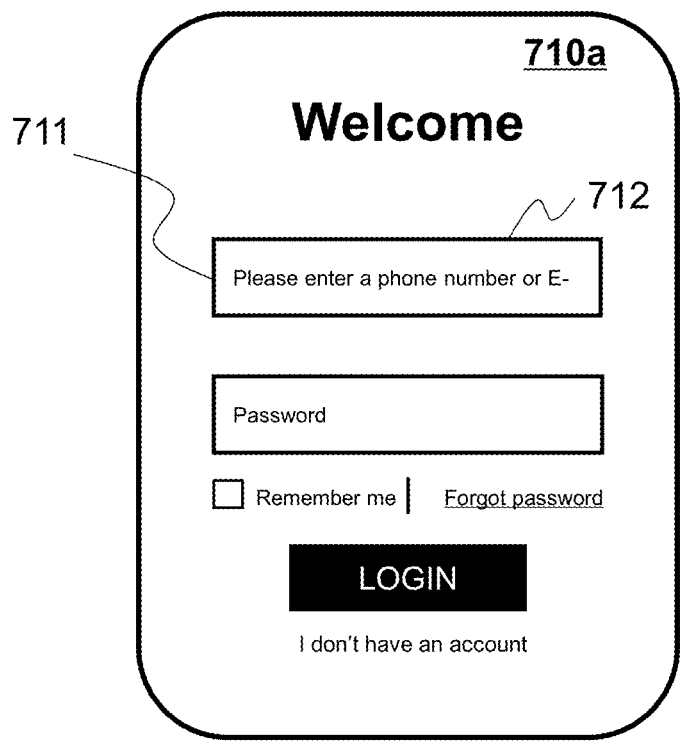
FIG. 7A and FIG. 7B illustrate exemplary user operations according to some embodiments of the present disclosure.
Figure 7B:
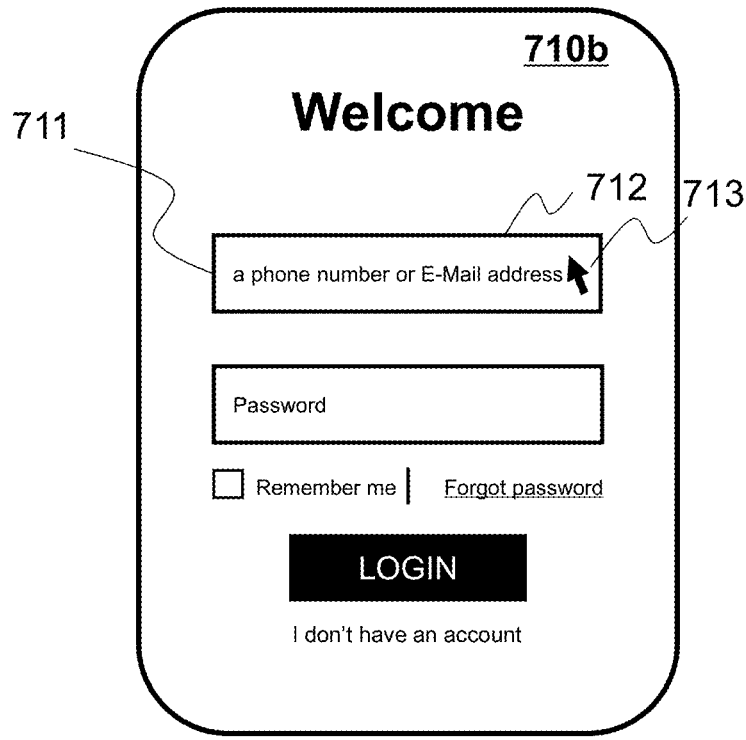

At 610, processing engine 300 may detect a user operation. In some embodiments, the user operation may be opening a form, putting a mouse pointer on the entry box, using a finger to touch the entry box, etc. Merely by way of example, as illustrated in form 700 of FIG. 7A, or FIG. 7B, or both. When there are no user operation detected in the entry box 712 of form 710a, as illustrated in FIG. 7A, the first prompt message 711 of form 710a may be displayed statically in the entry box. When a user operation (e.g., a mouser pointer 713) is detected by processing engine 300 in form 710b, as illustrated in FIG. 7B, 620 and 630 may be executed.

At 620, processing engine 300 may acquire a pixel length of the first prompt message (designated by L1) through acquisition module 310. At 630, processing engine 300 may acquire a pixel length of the entry box (designated by L2) through acquisition module 310. When L1 and L2 are acquired, 640 may be executed.

Figure 8A:
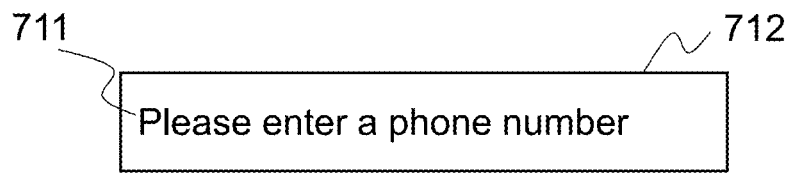
FIG. 8A and FIG. 8B illustrate exemplary pixel lengths of a prompt message and an entry box according to some embodiments of the present disclosure.
Figure 8B:
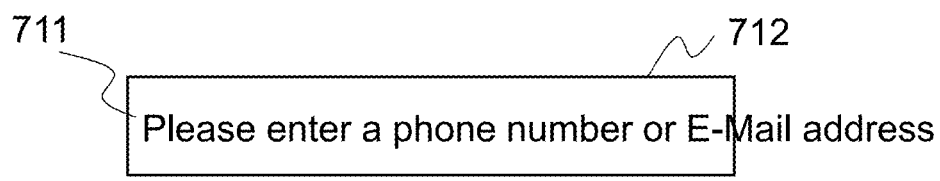

At 640, processing engine 300 may determine which one of L1 and L2 is larger than the other one through determination module 320. In some embodiments, as illustrated in FIG. 8A, when L2 is larger than L1, the first prompt message 711 may be displayed inside the entry box 712. As illustrated in FIG. 8B, when L1 is larger than L2, the first prompt message 711 may be displayed beyond the entry box 712. Based on the determination, if L1 is larger than L2, then 650 may be executed; if L2 is larger than L1, then 660 may be executed.

Figure 9A:
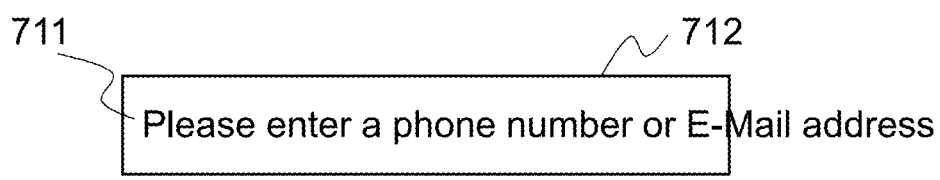
FIG. 9A through FIG. 9C illustrate exemplary movements of prompt messages according to some embodiments of the present disclosure.
Figure 9B:
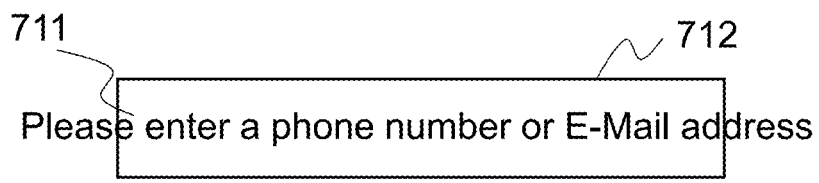
Figure 9C:
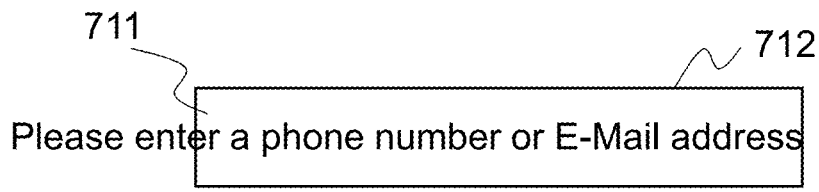

At 650, processing engine 300 may move the first prompt message 711 so that the entire prompt message may be displayed. In some embodiments, as illustrated in FIGS. 9A-9C, there may be only a part of the first prompt message 711 displaying in the entry box 712. In FIG. 9A, the front part of the first prompt message 711 may be displayed in the entry box 712, and the pixel length of a first part of the first prompt message that is displayed may be equal to the pixel length of the entry box 712. In FIG. 9B, the first prompt message 711 may be moved and a second part of the first prompt message 711 may be displayed in the entry box 712. In FIG. 9C, a third part of the first prompt message 711 may be displayed in the entry box 712. In some embodiments, the process from FIG. 9A to FIG. 9B and the process from FIG. 9B to FIG. 9C may be combined into a continuous and dynamic displaying process. For example, when the first prompt message is in the state as illustrated in FIG. 9C, the next state may be going back to FIG. 9A. At 660, processing engine 300 may display the first prompt message statically in the entry box 712, as showed in FIG. 8A.

In some embodiments, acquisition module 310 may also acquire the pixel width of the first prompt message (designated by W1) and the pixel width of the entry box (designated by W2). Determination module 320 may compare W1 and W2, and/or compare L1 and L2. If W1<W2 and L1<L2, the first prompt message may be displayed statically in the entry box. If W1<W2 and L1>L2, the first prompt message may move while being displayed so that the entire first prompt message may be displayed, as illustrated at 650. If W1>W2 and L1<L2, the pixel width of the first prompt message may be larger than the pixel width of the entry box, and processing engine 300 may move the first prompt message up and down in the entry box to allow the entire first prompt message to be displayed. If W1>W2 and L1>L2, then the form 700 may be redesigned. In some embodiments, processing engine 300 may decrease the font size of the first prompt message to fit the size of the entry box. Processing engine 300 may also increase the size of the entry box to accommodate the first prompt message.

In some embodiments, the displaying of the first prompt message may be irregular. For example, the first prompt message may be displayed in a circle for artistic designing. As another example, at least a portion of the first prompt message may be stylized. For instance, the key words of the first prompt message may be bold, underlined, in larger font size than the rest of the first prompt message, italic, or colored to catch a user's attention. In some embodiments, when the first prompt message is displayed dynamically in the entry box, the movement of the first prompt message may pause or slow down when the key words of the first prompt message appears in the entry box to allow a user to view the key words of the first prompt message clearly.

Figure 10:
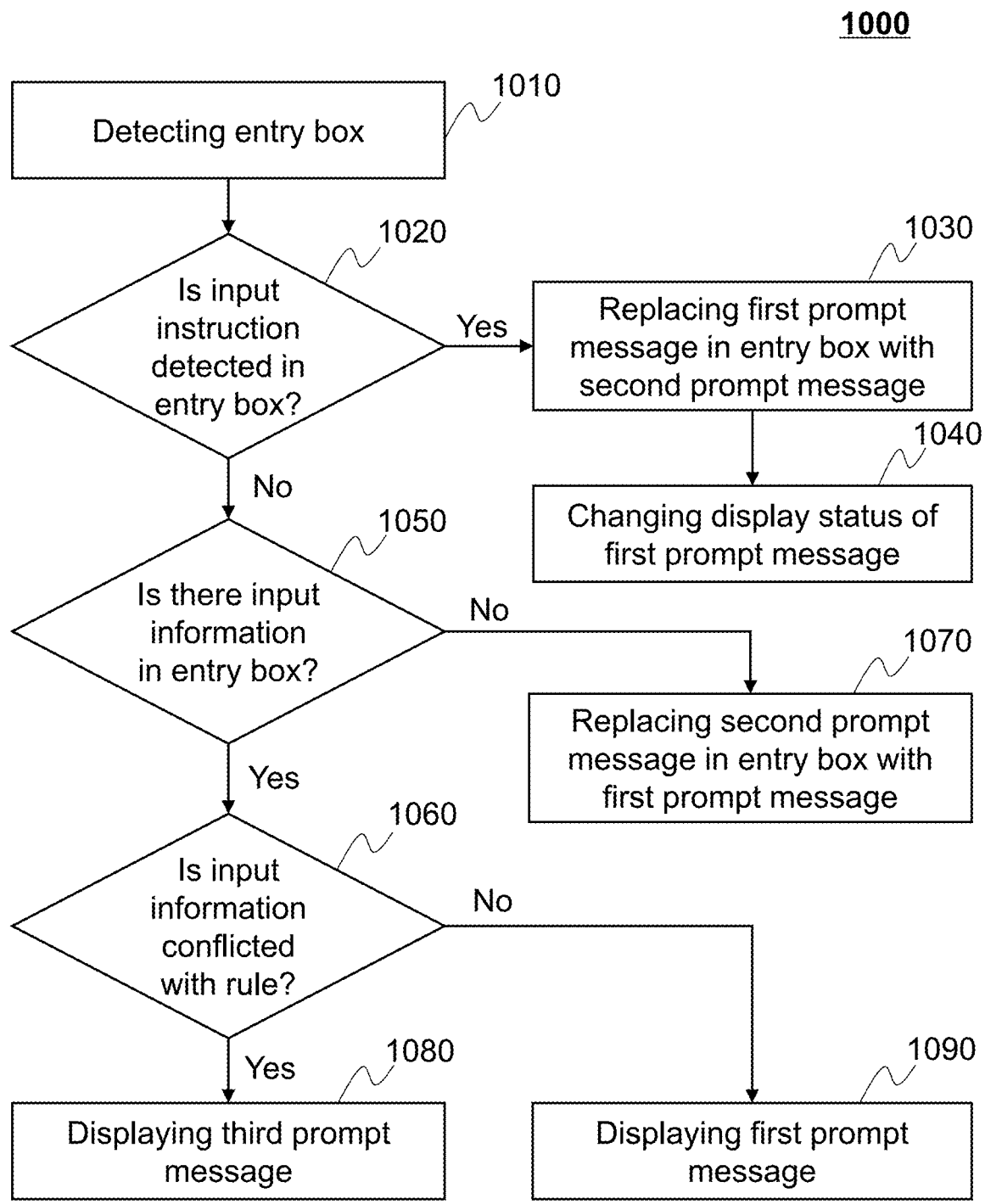
FIG. 10 is a flowchart of an exemplary process for displaying a prompt message according to some embodiments of the present disclosure.

FIG. 10 is a flowchart of an exemplary process 1000 for displaying a prompt message according to some embodiments of the present disclosure. In some embodiments, process 1000 may be implemented in computing device 200A and/or computing device 200B as illustrated in FIG. 2A, or FIG. 2B, or both. For example, process 1000 may be stored in database 140, DISK 207, ROM 203, RAM 204, memory 216, and/or storage unit 219 as in the form of instructions, and invoked and/or implemented by processing engine 300. In some embodiments, process 1000 may be used in 420, 430, and 440 of process 400 illustrated in FIG. 4.

Figure 11A:
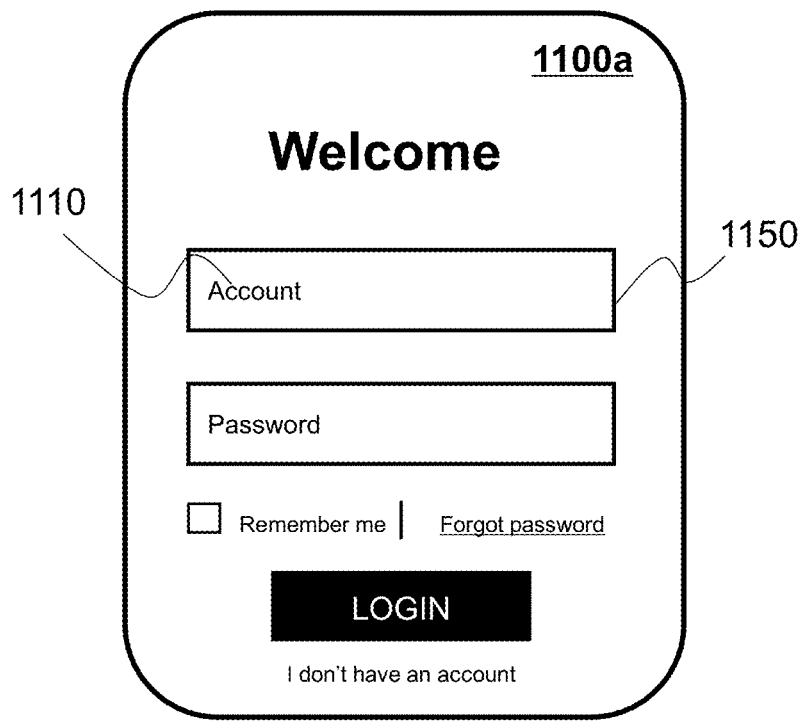
FIG. 11A and FIG. 11B illustrate examples of displaying a prompt message according to some embodiments of the present disclosure.
Figure 11B:
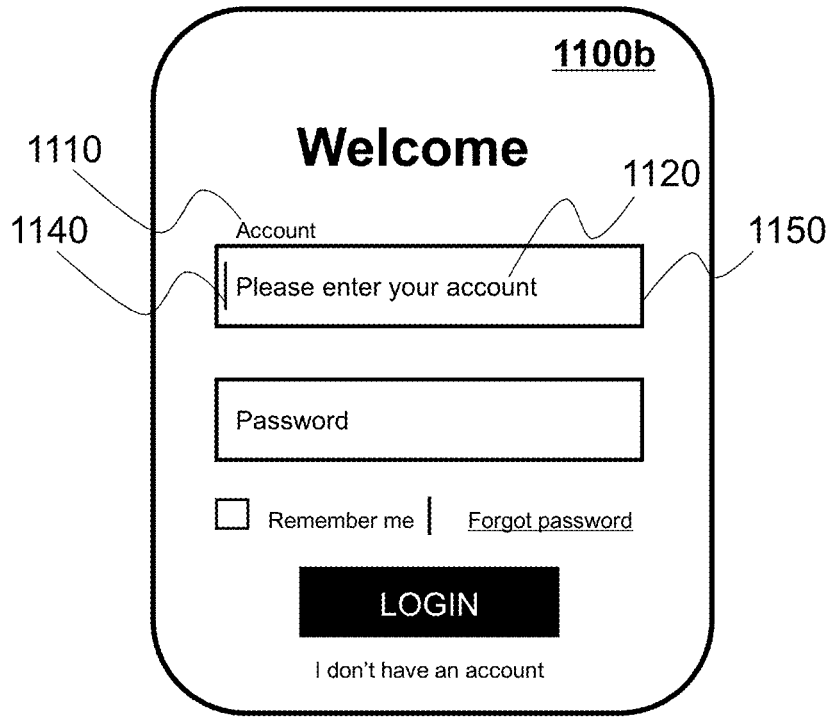

At 1010, processing engine 300 may detect an entry box. In some embodiments, the entry box may be positioned in a form which is on a user interface of an electronic terminal, including, for example, a register screen, a mailbox login screen, a shopping website login screen, an application login screen, or the like, or any combination thereof. For example, as illustrated in FIG. 11A, or FIG. 11B, or both, an entry box 1150 may be positioned in form 1100. As illustrated in FIG. 11A, a first prompt message 1110 may be displayed in the entry box 1150.

At 1020, processing engine 300 may determine whether an input instruction 1140 is detected in the entry box 1150. In some embodiments, the input instruction 1140 may be a mouse pointer clicking, a mouse pointer touching, a finger touching, etc.

When the input instruction 1140 is detected in the entry box 1150, at step 1030, processing engine 300 may replace the first prompt message 1110 in the entry box 1150 with a second prompt message 1120. For example, as illustrated in FIG. 11A and FIG. 11B, when there is no input instruction in an entry box 1150 in form 1100a, a first prompt message 1110 "Account" may be displayed in the entry box 1150. When there is an input instruction 1140 in the entry box 1150 in form 1100b, processing engine 300 may replace the first prompt message 1110 "Account" in the entry box 1150 with a second prompt message 1120 "Please enter your account." In some embodiments, when the second prompt message 1120 is displayed in the entry box 1150, the display status of the second prompt message 1120 may be similar to the display status of the first prompt message as illustrated in FIG. 6. The second prompt message 1120 may be displayed statically or dynamically. In some embodiments, when a user is typing in a message in the entry box, the input instruction 1140 may remain in the entry box until the user finishes typing. The input instruction 1140 may move with the typed message so that the input instruction 1140 and the typed message show in the entry box. In some embodiments, the second prompt message 1120 may be continuously displaying when the user is typing in message, and the second prompt message may be not overlap with input information.

Figure 12A:
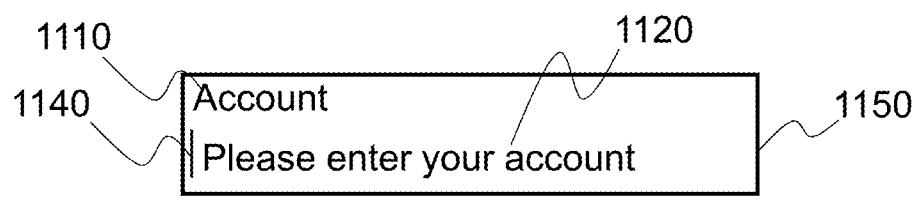
FIG. 12A and FIG. 12B illustrate examples of changing the display status of a first prompt message according to some embodiments of the present disclosure.
Figure 12B:
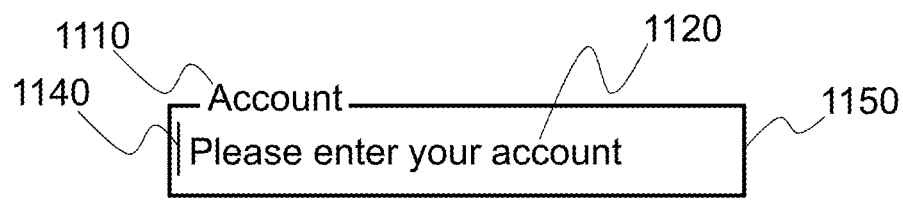

At 1040, processing engine 300 may change the display status of the first prompt message 1110. For example, as illustrated in FIG. 11A and FIG. 11B, when the input instruction 1140 is detected in the entry box 1150, the position of the first prompt message 1110 "Account" may be changed. In some embodiments, the first prompt message 1110 may be moved to a place outside the entry box 1150. Merely by way of example, as shown in FIG. 11B, the first prompt message 1110 may be moved to the top left outside of the entry box 1150. In some embodiments, the first prompt message 1110 may be moved to a place in the entry box 1150. Merely by way of example, as shown in FIG. 12A, the first prompt message 1110 may be moved to a top left corner of the entry box 1150, and the second prompt message 1120 may be displayed under the first prompt message 1110. The font size of the first prompt message 1110 and/or the size of the entry box 1150 may also be changed. In some embodiments, the first prompt message 1110 may be moved to a place around the boarder of the entry box 1150. Merely by way of example, as shown in FIG. 12B, the first prompt message 1110 may be on the top left boarder of the entry box 1150.

When the input instruction is not detected in the entry box, processing engine 300 may execute 1050.

At 1050, processing engine 300 may determine whether there is input information in the entry box. In some embodiments, the input information may be a name, a telephone number, an email address, or an account number, or the like, or any combination thereof. When there is input information in the entry box, 1060 may be executed. When there is no input information in the entry box, 1070 may be executed.

In some embodiments, when a user is typing information in the entry box, processing engine 300 may predict what the user is typing based on the characters the user has entered so far in the entry box. Furthermore, processing engine 300 may provide a set of one or more predicted entries (or referred to as candidate entries or suggested entries) based on the portion of the typed input information. For example, when input information "XXXXXXX@" has been typed in the entry box, a set of predicted entries, including, for example, "sina.com," "163.com," "gmail.com," "qq.com," etc., may be displayed. The user may select one of the predicted entries. The predicted entries may be displayed in the entry box or outside the entry box. For example, one or more candidate entries may be displayed to the right of the input information in the entry box. As another example, one or more candidate entries may be displayed as a list at the bottom of the entry box. One candidate entry may be chosen by the user through, for example, moving a mouse pointer.

In some embodiments, processing engine 300 may analyze history input information of the user (or a group the user belonging to) and determine a relevant input information. For example, if the user frequently accesses a certain e-mail address, the e-mail address may be provided high in the position in a list of candidate entries, for example, the first of the list of the candidate entries. A group the user belonging to may be determined based on, for example, the identification the user specifies, or at least a common character the user shares with other users (e.g., occupation, address, gender, age or age range, or the like, or any combination thereof). In some embodiments, the common character may be identified by processing engine 300.

At 1060, processing engine 300 may determine whether the input information in the entry box conflicts with a rule. The rule may be stored in server 110, network 120, electronic terminal 130, or database 140, etc. In some embodiments, the rule may be used to determine whether input information is accurate. Merely by way of example, accuracy may be determined by assessing content, format, uniqueness, consistency, or gramma of the input information.

At 1070, processing engine 300 may replace the second prompt message 1120 in the entry box 1150 with the first prompt message 1110. For example, as illustrated in FIG. 11A, there is no input instruction or input information in the entry box 1150, and then the first prompt message 1110 "Account" may be displayed in the entry box 1150 again. Because there is no input instruction or input information in the entry box, the status of the form returns to the original status. So the second prompt message may disappear and the first prompt message may be displayed in the entry box, like the status showed in FIG. 11A. In some embodiments, when the user deletes all the input information and moves the mouse pointer to another interface or some blank area, the second prompt message may be replaced by the first prompt message.

Figure 13A:
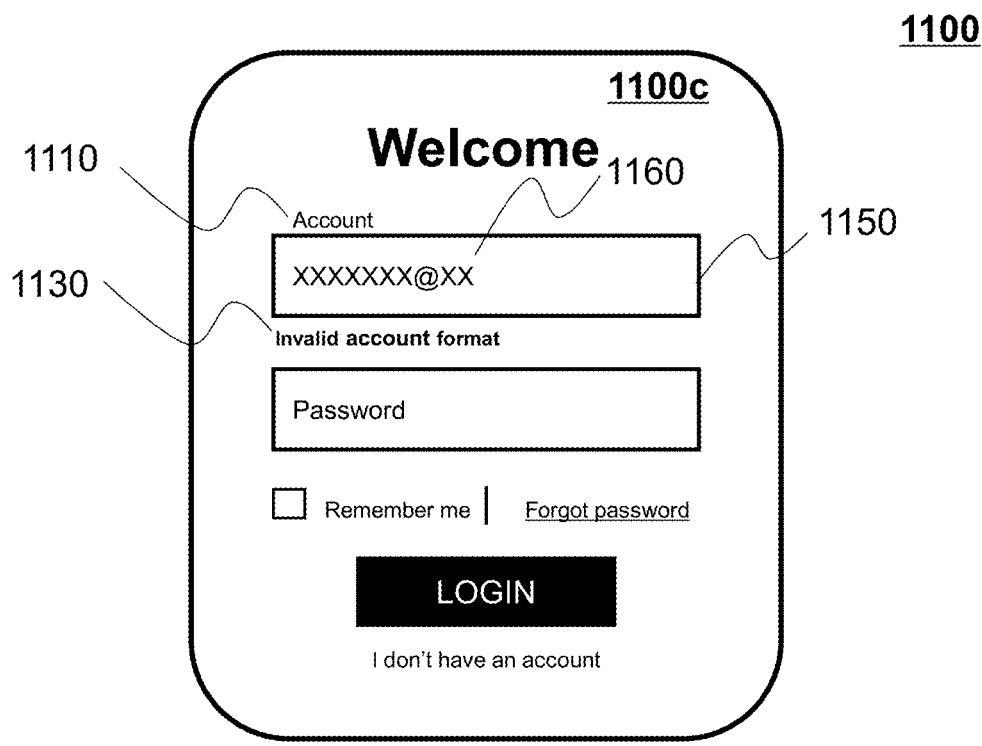
FIG. 13A and FIG. 13B illustrate examples of displaying a prompt message according to some embodiments of the present disclosure.

When the input information in the entry box conflicts with the rule, at 1080, processing engine 300 may display a third prompt message. The third prompt message may be used for informing that there may be an error in the input information. For example, as illustrated in FIG. 13A, if input information 1160 "XXXXXXX@XX" in the entry box 1150 conflicts with a format rule, a third prompt message 1130 "Invalid account format" may be displayed outside the entry box 1150 in form 1100c. The position of the third prompt message 1130 may be various, for example, at a bottom right place of the entry box 1150. As another example, the third prompt message 1130 may replace the first prompt message 1110 and appear in the entry box 1150 in FIG. 13A. In some embodiments, if the input information in the entry box does not conflict with the rule, but it does not match relevant data stored in database 140, the third prompt message 1130 may also be displayed in the form. When the third prompt message is displayed in the form, the user may be prompted to check and revise the input information.

Figure 13B:
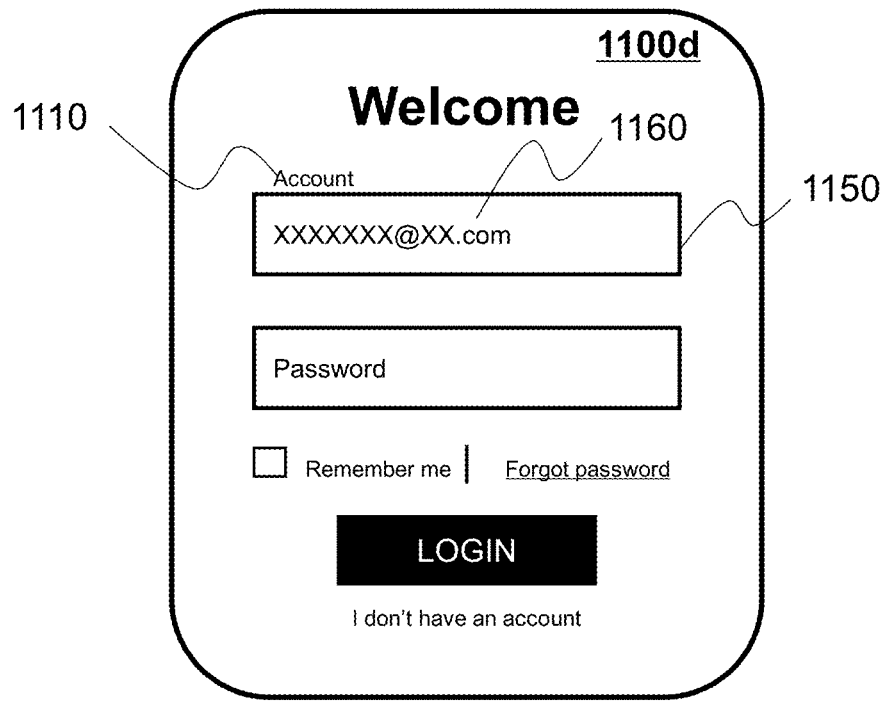

If the input information in the entry box does not conflict with the rule, 1090 may be executed. At 1090, processing engine 300 may display the first prompt message. For example, as illustrated in FIG. 13B, an input information 1160 "XXXXXXX@XX.com" in the entry box 1150 is valid, and a first prompt message 1110 may remain in the entry box 150 in form 1110d.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for displaying a prompt message to a user in an entry box of a user interface of an electronic terminal, the entry box having a first prompt message displayed therein, the system comprising:
    a bus;
    a storage medium in connection with the bus, configured to store data and instructions; and
    at least one processor in communication with the storage medium, wherein when executing the instructions, the at least one processor is directed to:
        determine if there is a cursor in the entry box, replace the first prompt message with a second prompt message and display the second prompt message in the entry box, while displaying the first prompt message elsewhere on the user interface,
    wherein to display the second prompt message in the entry box, the at least one processor is further directed to:
        acquire a pixel length of the second prompt message and a pixel length of the entry box; and
        determine if the pixel length of the second prompt message is larger than the pixel length of the entry box, dynamically display the second prompt message in the entry box to allow the user to view the second prompt message in full, and
    wherein the replacement of the first prompt message with the second prompt message is triggered by the cursor only without actual input of any content into the entry box.

2. The system of claim 1, wherein the at least one processor is further directed to open a form including the entry box or put a mouse pointer on the entry box.

3. The system of claim 1, wherein
    the dynamic display of the second prompt message comprises scrolling the second prompt message back and forth in the entry box.

4. The system of claim 1, wherein the cursor is introduced by at least one of a mouse pointer clicking, a mouse point touching, or a finger touching on the entry box.

5. The system of claim 1, wherein to display the first prompt message elsewhere on the user interface, the at least one processor is further directed to perform at least one of:
    making the first prompt message disappear,
    changing a position of the first prompt message,
    changing a font size of the first prompt message,
    changing a color of the first prompt message, or
    playing an audio clip associated with the first prompt message.

6. The system of claim 5, wherein changing the position of the first prompt message comprises moving the first prompt message to: a different place in the entry box, a place on a border of the entry box, or a place outside the entry box.

7. The system of claim 1, wherein the at least one processor is further directed to:
    determine if there is input information in the entry box and if the input information in the entry box contains an error that conflicts with a rule, display a third prompt message configured to reflect the conflict and to remind the user of the error of the input information.

8. The system of claim 7, wherein the conflict determination is based on information from an external source.

9. The system of claim 1, wherein if it is determined that there is no cursor in the entry box, the at least one processor is further directed to:
    determine if there is no input information in the entry box, replace the second prompt message in the entry box with the first prompt message.

10. The system of claim 1, wherein if the pixel width of the first prompt message is larger than the pixel width of the entry box, the at least one processor is further directed to:
    decrease a font size of the first prompt message or increase a size of the entry box to accommodate the first prompt message.

11. The system of claim 1, upon receiving and displaying a user input in the entry box, the at least one processor is further directed to:
    display the cursor after the user input and
    display the first prompt message or the second prompt message in a suspension box that moves along with the cursor.

12. A method for displaying a prompt message to a user in an entry box of a user interface of an electronic terminal, the entry box having a first prompt message displayed therein, the method comprising:
    determining if there is cursor in the entry box, replacing the first prompt message with a second prompt message and display the second prompt message in the entry box, while displaying the first prompt message elsewhere on the user interface,
    wherein displaying the second prompt message in the entry box including:
        acquiring a pixel length of the second prompt message and a pixel length of the entry box; and
        determining if the pixel length of the second prompt message is larger than the pixel length of the entry box, dynamically display the second prompt message in the entry box to allow the user to view the second prompt message in full, and
    wherein the replacement of the first prompt message with the second prompt message is triggered by the cursor only without actual input of any content into the entry box.

13. The method of claim 12, further comprising performing a user operation that comprises opening a form including the entry box or putting a mouse pointer on the entry box.

14. The method of claim 12, wherein the dynamic display of the second prompt message comprises scrolling the second prompt message back and forth in the entry box.

15. The method of claim 12, wherein the cursor is introduced by at least one of a mouse pointer clicking, a mouse point touching, or a finger touching on the entry box.

16. The method of claim 12, wherein displaying the first prompt message elsewhere on the user interface comprises at least one of:
    making the first prompt message disappear,
    changing a position of the first prompt message,
    changing a font size of the first prompt message,
    changing a color of the first prompt message, or
    playing an audio clip associated with the first prompt message.

17. The method of claim 16, wherein changing the position of the first prompt message comprises moving the first prompt message to: a different place in the entry box, a place on a border of the entry box, or a place outside the entry box.

18. The method of claim 12, further comprising:
    determining if there is input information in the entry box and if the input information in the entry box contains an error that conflicts with a rule, displaying a third prompt message configured to reflect the conflict and to remind the user of the error of the input information.

19. The method of claim 18, wherein the conflict determination is based on information from an external source.

20. The method of claim 12, if it is determined that there is no cursor in the entry box, the method further comprising:
   determining if there is no input information in the entry box, replacing the second prompt message in the entry box with the first prompt message.

\* \* \* \* \*